(12) United States Patent
Moriwaki

(10) Patent No.: US 7,764,672 B2
(45) Date of Patent: Jul. 27, 2010

(54) PACKET COMMUNICATION DEVICE

(75) Inventor: Norihiko Moriwaki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1143 days.

(21) Appl. No.: 10/759,237

(22) Filed: Jan. 20, 2004

(65) Prior Publication Data

US 2004/0184453 A1  Sep. 23, 2004

(30) Foreign Application Priority Data

Mar. 19, 2003  (JP)  ............... 2003-075537

(51) Int. Cl.
*H04L 12/28* (2006.01)
(52) U.S. Cl. ................ 370/389; 370/386; 370/388; 370/393; 370/359
(58) Field of Classification Search ............. 370/254, 370/278, 299, 401, 419, 359, 386, 389, 388, 370/393
See application file for complete search history.

(56) References Cited

U.S. PATENT DOCUMENTS

| | | | |
|---|---|---|---|
| 5,414,704 A * | 5/1995 | Spinney .................. 370/389 |
| 5,905,725 A * | 5/1999 | Sindhu et al. ............. 370/389 |
| 5,918,074 A * | 6/1999 | Wright et al. .............. 710/52 |
| 6,320,859 B1 * | 11/2001 | Momirov ................ 370/395.1 |
| 6,424,659 B2 * | 7/2002 | Viswanadham et al. ..... 370/469 |
| 6,934,283 B1 * | 8/2005 | Warner .................... 370/380 |
| 6,944,168 B2 * | 9/2005 | Paatela et al. .............. 370/401 |
| 7,006,504 B2 * | 2/2006 | Yoon et al. .............. 370/395.6 |
| 7,164,698 B1 * | 1/2007 | Krishnamurthi et al. .... 370/541 |
| 7,394,825 B2 * | 7/2008 | Kim et al. ................. 370/466 |
| 7,400,015 B1 * | 7/2008 | Clark et al. ................ 257/330 |
| 7,424,019 B1 * | 9/2008 | Kopelman et al. .......... 370/392 |
| 2002/0126671 A1 * | 9/2002 | Ellis et al. ................. 370/390 |
| 2003/0041163 A1 * | 2/2003 | Rhoades et al. ............ 709/232 |

FOREIGN PATENT DOCUMENTS

| | | |
|---|---|---|
| JP | 10023072 | 1/1998 |
| JP | 11205339 | 7/1999 |
| JP | 2001007847 | 1/2001 |
| JP | 2001211203 | 8/2001 |
| JP | 2002-64542 | 2/2002 |

OTHER PUBLICATIONS

Mimura, et al., "Terabit Node for Next-generation IP Networks", Hitachi Review, vol. 49, 2000, No. 4, pp. 155-158.

* cited by examiner

*Primary Examiner*—Ricky Ngo
*Assistant Examiner*—Dewanda Samuel
(74) *Attorney, Agent, or Firm*—Brundidge & Stanger, P.C.

(57) ABSTRACT

Disclosed is a packet communication device capable of flexibly adding a function easily without suspending the service. To the switch element (SWE), the interface element (IFE) and the controller (CTRL) are connected. The function processor (FP) can be connected to SWE in accordance with the necessary function and number. In the IFE, it is judged what kind of functional processing is required for an incoming packet, and through which output IFE, the transmission is performed to the outside, and the forwarding information when the packet is forwarded within the packet device on the basis of the judgment result will be imparted to the packet.

7 Claims, 10 Drawing Sheets

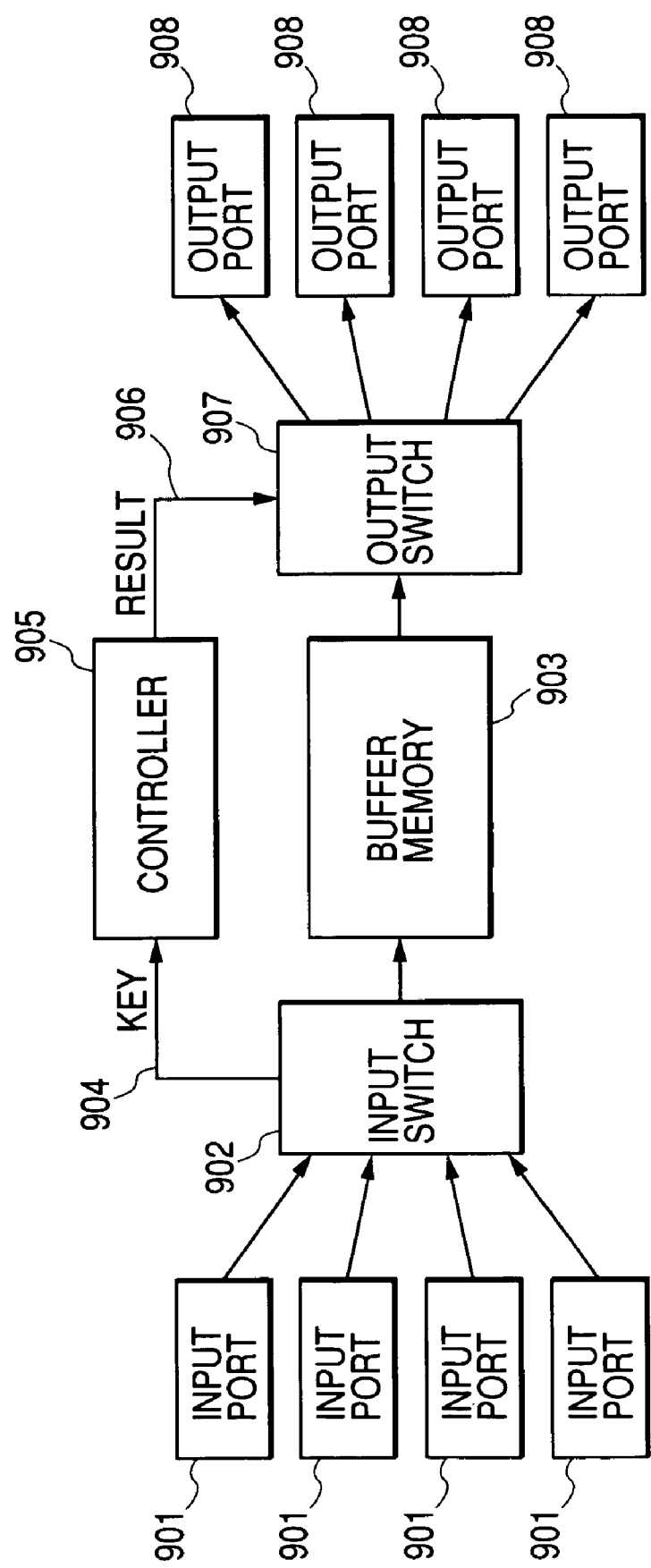

PACKET COMMUNICATION DEVICE

FIELD OF THE INVENTION

The present invention relates to a packet communication device capable of easily adding a function to be requested and on adding the function, capable of minimizing a time period for suspending the service.

BACKGROUND OF THE INVENTION

In recent years, data traffic mainly based on use of Internet has been abruptly increasing. There is also a move afoot to do, on the Internet, highly reliable service of high quality such as transaction processing which has conventionally been performed using a leased line. In order to cope with this, it is required to meet the tendency of not only a transmission path, but also the packet data communication device with larger capacity, higher speed and higher reliability. Further, in order to cope with a new routing protocol or a new service quickly in the future, or in order to make it possible to simply add a necessary function, the flexibility of adding a function is requested for the packet data communication device.

For example, a router device performs layer 3 processing as a packet data communication device. Particularly, many high-performance router devices enable high performance routing and forwarding with hardware. The structure of a hardware router has been disclosed in Non-patent Literature 1, for example.

FIG. 12 shows an outline of a hardware router disclosed in the Non-Patent Literature 1. A plurality of routing processors 801 each having a network interface 811 are connected to each other through a crossbar switch 800. Each routing processor 801 is composed of: a forwarding controller 812; a routine processor 813; a routing table 814; and a packet buffer 815. A header of an incoming packet from the network interface 811 is extracted by the forwarding controller 812, and the route is retrieved by hardware in the routing processor 813. In the routing table 814, output destination information corresponding to a destination IP address, security-oriented filtering information and information of QoS (Quality of Service) are stored beforehand. The IP packet, search processing of which has been completed, is inputted into the packet buffer 815, and after arbitration for output among other routing processors 801 is performed, is transferred to a desired output port through the crossbar switch 800. The routing manager 802 deals with a routing protocol, which transmits and receives routing information to or from other routers connected thereto to determine a forwarding path of each IP packet. The forwarding path thus determined is reflected to the routing table 814 within the routing processor 801. As described above, this is constructed such that the routine processors and the packet buffers are separated.

Another example of the structure of hardware router is disclosed in a Patent Literature 1.

FIG. 13 shows an outline of a hardware router disclosed in the Patent Literature 1. An incoming IP packet through an input port 901 is stored in a buffer memory 903 through an input switch 902. In the input switch 902, KEY information 904, such as a destination IP address in the IP packet, is read out and transferred to a controller 905. In the controller 905, after destination search processing for each packet is performed, this result (RESULT 906) is transmitted to an output switch 907. In the output switch 907, the IP packet stored in a buffer memory 903 is read out on the output port 908 according to the RESULT 906. As described above, this is constructed such that the routing processor and the packet buffer are centralized.

Furthermore, in a Patent Literature 2, there has been disclosed a hardware router in which a labeling packet and the IP packet are judged by an input line interface, and the IP header is transmitted to a forwarding engine for being processed according to the judgment result. However, no consideration has been given to scalability or extensibility of the processing.

[Non-Patent Literature 1]

Itaru Mimura and two others, "Terabit Node for Next-generation IP Networks", [online], December 2000, HITACHI REVIEW, retrieved on Jan. 30, 2003, Internet.

[Patent Literature 1]

U.S. Pat. No. 5,905,725

[Patent Literature 2]

JP-A No. 64542/2002

The switch shown in the Non-Patent Literature 1 is comparatively high in scalability in processing capacity because the routing function and the forwarding function are separated. In the structure shown in the Non-Patent Literature 1, however, the forwarding controller and the routing controller are tightly coupled and are mounted on the same routing processor. When it is considered that these are implemented with hardware, in order to cope with new routing protocol or a new service quickly, the whole hardware needs to be modified. In other words, the structure is not suitable for adding new function easily.

Also, the switch disclosed in the Patent Literature 1 has good efficiency of buffer memory usage, because the routing function and the forwarding function are centralized, and has a feature that the device can be downsized. However, it is difficult to scale up this structure, because processing of the routing function and the forwarding function is prone to become a bottleneck of the system. Therefore the structure is inferior in terms of performance scalability. The routing function and the forwarding function are separated in this system and in order to, for example, cope with new protocol, it is required to remake the routing hardware. Therefore it does not have flexibility in adding a function. Besides, this system does not have a structure in which any application layer services can be added as needed.

SUMMARY OF THE INVENTION

An object of the present invention is to provide a packet communication device having flexibly in terms of adding a function. Specifically, a packet communication device of minimum subset structure having only a simple packet forwarding function, is provided as a base model. Also, in order to implement function of scalability and upgradability, it is another object of the present invention to provide a packet communication device capable of adding functions such as application layer processing and functional service to the base model as needed. More specifically, it is still another object of the present invention to provide a packet communication device such that an incoming packet may be able to selectively use one or a plurality of these functional services when a plurality of functional services is provided. Further, it is still another object of the present invention to provide a packet communication device having such performance scalability as to easily enhance and upgrade the performance without suspending the service according to necessary performance of the same function.

To solve the above-described problems, the present invention provides: a plurality of line interfaces capable of at least one of reception and transmission of a packet; a plurality of ports, to which the plurality of line interfaces are connected, and to which at least one functional processor, to perform functional processing on an incoming packet received by any of the plurality of line interfaces, can be installed as needed; a function item judgment unit for judging a function item to be required for the incoming packet; a forwarding information generator for determining a forwarding port for the incoming packet in accordance with the function item obtained by judging by the function item judgment unit, and imparting, to the incoming packet, the forwarding information, that is information for designating the forwarding port; and a forwarding path switching unit for switching the forwarding path when forwarding among the plurality of ports on the basis of the forwarding information.

The present invention exhibits the following effects:

(1) When constituting a packet communication device, it is possible to provide a packet communication device having such function scalability as to be able to add functions such as application layer processing and functional service to the base model as a functional module with a packet communication device having only a simple forwarding function of, for example, layer 2 or layer 3 as a base model.

(2) It is possible to provide a packet communication device having such function scalability as to be able to add functions such as application layer processing and functional service to the base model as a functional module with a packet communication device having only a simple forwarding function of, for example, layer 2 or layer 3 as a base model, in which when a plurality of functional services is provided, an incoming packet is capable of selectively using one or a plurality of these functional services.

(3) It is possible to provide a packet communication device having such function scalability as to be able to add functions such as application layer processing and functional service to the base model as a functional module with a packet communication device having only a simple forwarding function of, for example, layer 2 or layer 3 as a base model, in which when a plurality of functional services are provided, the packet communication device has such performance scalability as to be able to easily enhance and upgrade the performance without suspending the service by adding a functional module in accordance with necessary performance of the function.

BRIEF DESCRIPTION OF THE DRAWINGS

FIG. 13 is a block diagram showing structure of a conventional packet communication device.

DETAILED DESCRIPTION OF THE PREFERRED EMBODIMENTS

First Embodiment

Figure 1:
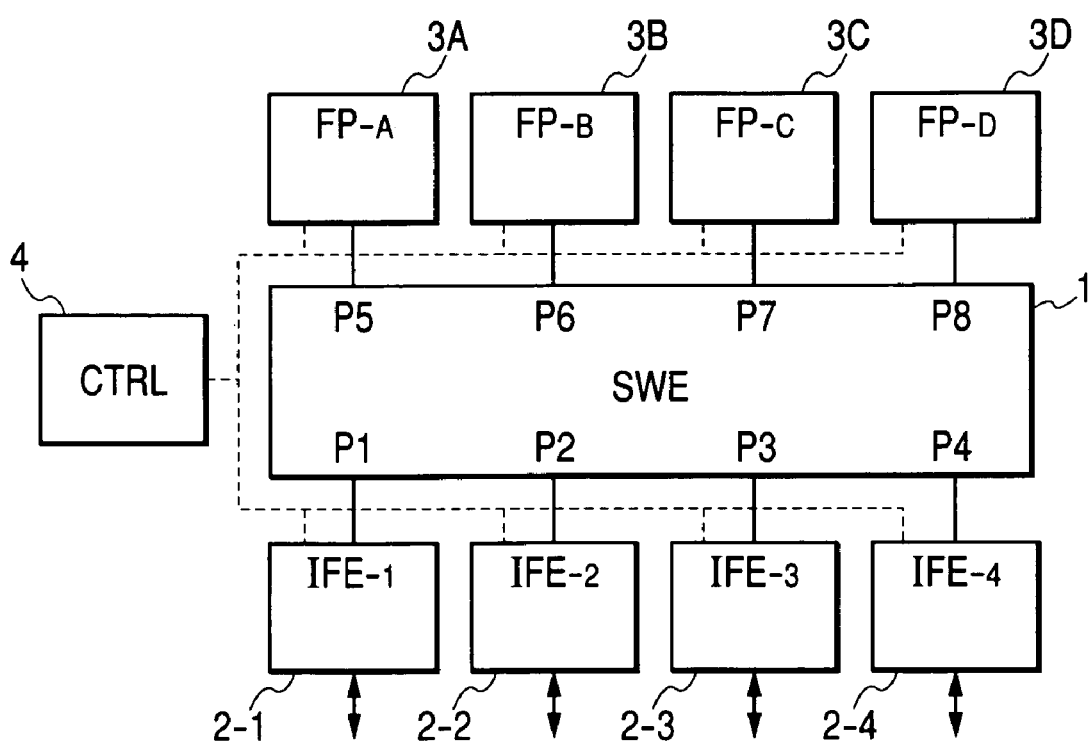
FIG. 1 is a block diagram showing a function block of a packet communication device according to a first embodiment of the present invention.

FIG. 1 shows the general structure of a packet communication device according to the first embodiment of the present invention. A plurality of interface elements (IFE) 2-1 to 2-4, and a plurality of function processors (FP) 3A to 3D for performing various functional processing, are connected to the packet communication device. The packet communication device has a switch element (SWE) 1, to which the IFE 2-1 to 2-4 are connected, for switching, and a controller (CTRL) 4. The CTRL4 controls the entire device, and processes the routing protocol. Specifically, using routing protocols such as RIP (Router Information Protocol) and OSPF (Open Shortest Path First), the CTRL4 collects path information from other devices for entry. The plurality of IFE2-1 to IFE2-4 is connected to ports P1 to P4 of the SWE1 respectively. Also, FP3A to FP3D are connected to ports P5 to P8 of the SWE1 respectively.

Figure 2:
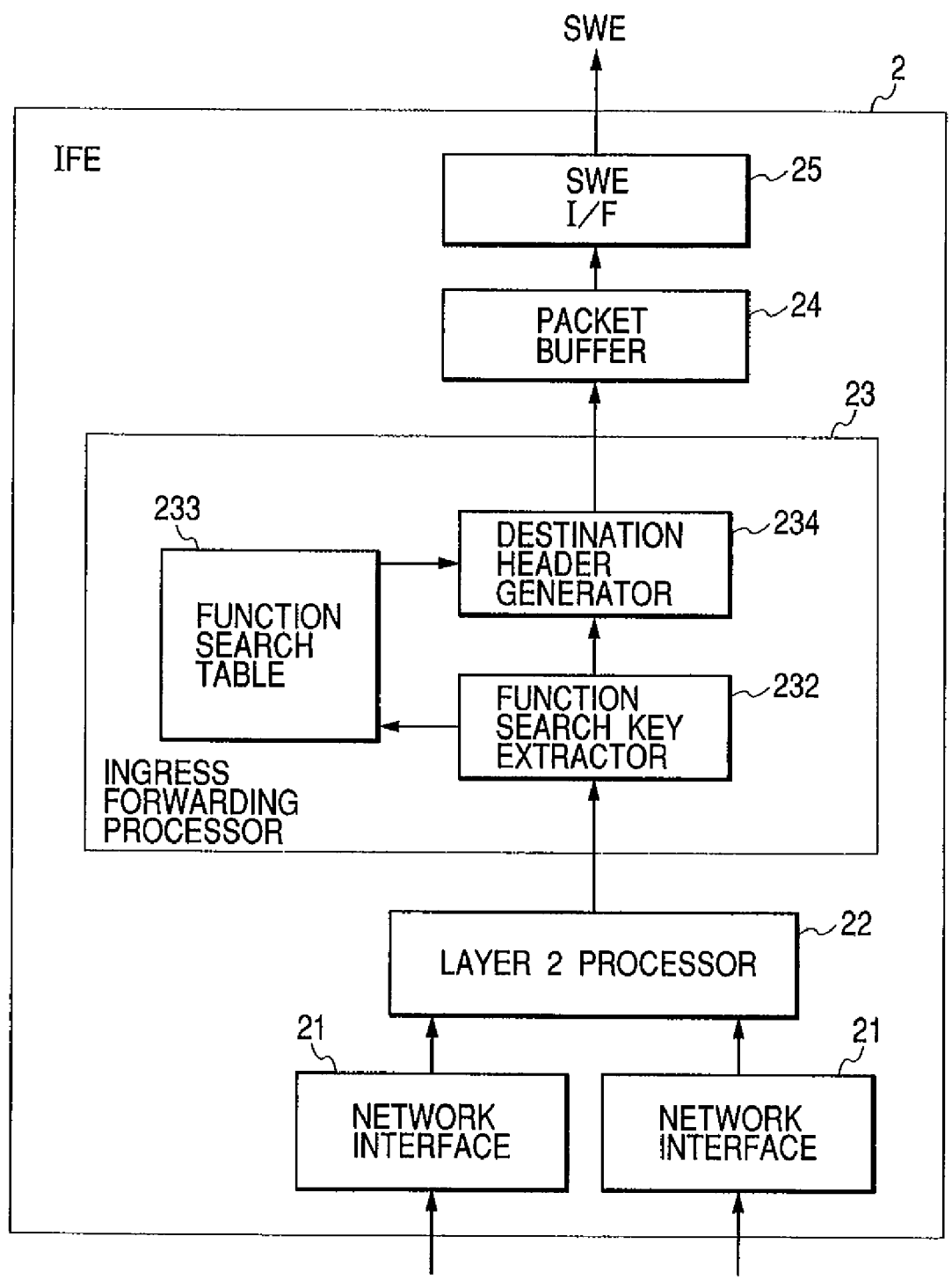
FIG. 2 is a block diagram showing one structure of an interface module of a packet communication device according to the present invention.

With reference to FIG. 2, the description will be made of an example of the structure of IFE2. The IFE2 has a network interface 21, a layer 2 processor 22, an ingress forwarding processor 23, a packet buffer 24, a switch element interface (SWE I/F) 25.

A frame inputted into the device is subjected to physical layer processing in the network interface 21. When it is connected to Ethernet (registered trade-mark), the frame is subjected to MAC (Media Access Control) layer processing. Thereafter, in the layer 2 processor 22, the object output port of the destination MAC address will be identified by using the destination address, the source address, VID (VLAN ID), FDB (Forwarding Database) and the like.

Thereafter, the frame (which is referred to as packet in the layer 3) is inputted into an ingress forwarding processor 23. The ingress forwarding processor 23 is composed of a function search key extractor 232, a function search table 233 and a destination FP header generator 234. From the packet, header information is extracted by the function search key extractor 232. With this header information as a key, the function search table 233 tells whether or not functional processing is necessary, and which functional processing is required.

Figure 7:
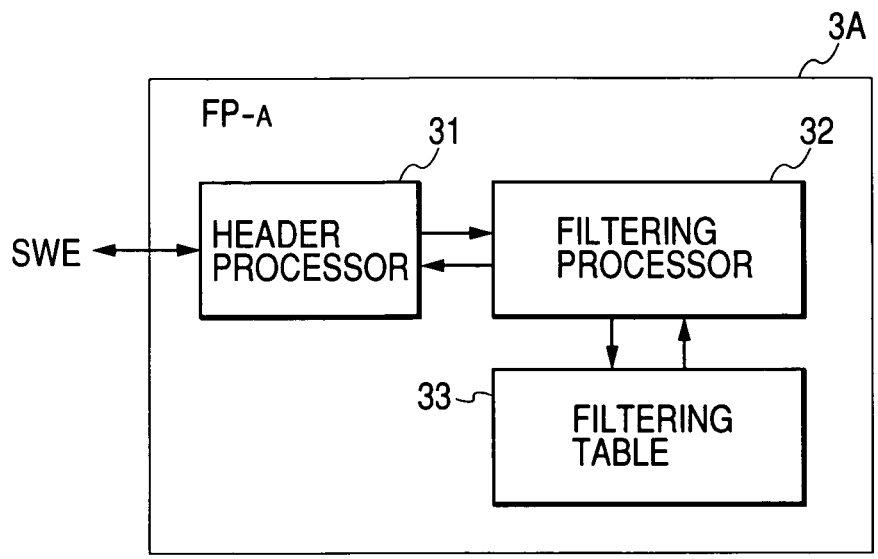
FIG. 7 is a block diagram showing a structural example of a function processor of the packet communication device according to the present invention.

Next, the functional processing will be described. In the present embodiment, the functional processing means processing of a higher order than the layer 3. As its example, there are security processing such as filtering, processing of application layer and the like. When filtering processing is performed as, for example, functional processing, the FP3A takes such structure as shown in FIG. 7. In FIG. 7, the FP-A 3A is composed of a filtering processor 32 peculiar to the filtering processing and a filtering table 33 in addition to a header processor 31 which exists in all FP3. From the packet inputted into the FP-A 3A, address information is extracted by the header processor 31 to transmit to the filtering processor 32. With this address information as a key, the filtering table 33 will be searched to acquire information on approval/disapproval of specific address passage. According to the search result, only a packet having an approved forwarding address is outputted from the FP-A 3A, and a packet having a disapproved forwarding address is discarded by the FP-A 3A. By the above-described functional processing in the FP-A 3A, it becomes possible to provide a packet communication device having a security function.

Figures 5, 6:
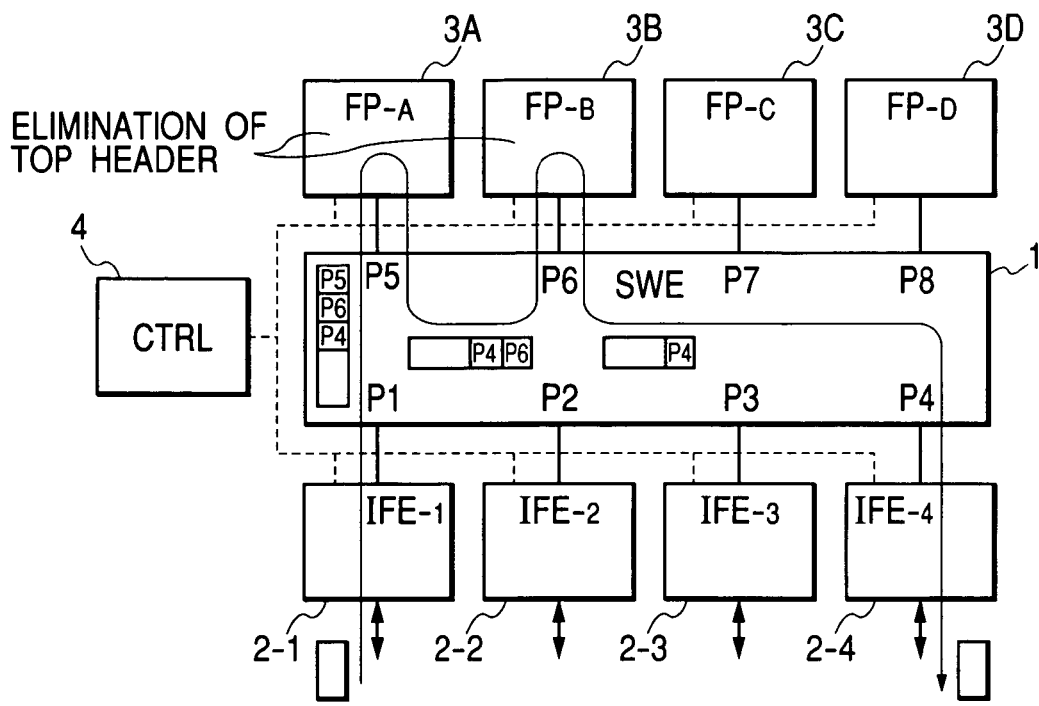
FIG. 5 is a block diagram showing further another example in which a packet is forwarded within a packet communication device according to the present invention.
FIG. 6 is a block diagram showing a structural example of a function search table of the packet communication device according to the present invention.

With reference to FIG. 6, the description will be made of structure of the function search table 233 shown in FIG. 2. With an address 2331 (destination address, source address, or a combination of the destination address and source address) within the header information in the incoming packet and the like as a key, a required function 2332 and an output port 2333 for the packet will be searched. Any entries in this function search table 233 can be added and deleted from the CTRL4 even when the packet communication device is in service.

Using the search result from the function search table 233, a port number (one or plural) of FP3 corresponding to the functional processing to be required and a port number of IFE2 at the output destination are added to the packet at the destination header generator 234 (FIG. 2). When the functional processing is not required, only the port number of IFE2 at the output destination is added to the packet. In this case, it is assumed that the port number is a value for identifying a connection port of SWE1 and has been allocated uniquely within the packet communication device in advance.

A packet outputted from an ingress forwarding processor 23 (FIG. 2) is inputted into a packet buffer 24. This packet buffer 24 is used for queuing when, of ports connected to SWE1, output requests from the plurality of IFE2 overlap in a specified port. In order to reduce waiting time for output due to the queuing, the packet buffer 24 may be constructed such that they are divided into a plurality of output queues corresponding to output destinations of packets (generally referred to as VOQ (Virtual Output Queue).

The packet outputted from the packet buffer 24 is outputted to SWE1 shown in FIG. 1 through the switch element interface (SWE I/F) 25.

Next, the description will be made of how the packet will be forwarded in the packet communication device.

Packet Forwarding Requiring No Function

Figure 3:
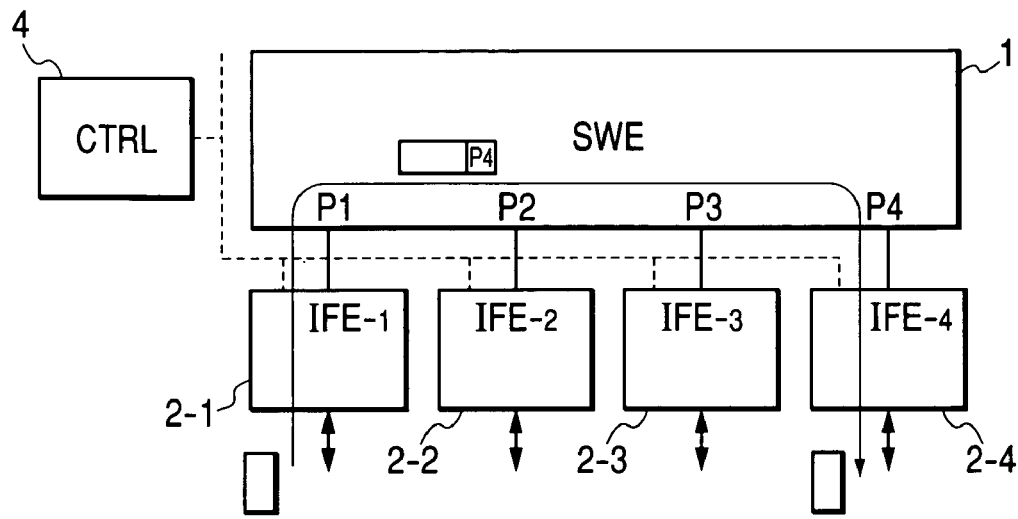
FIG. 3 is a block diagram showing an example in which a packet is forwarded within a packet communication device according to the present invention.

With reference to FIG. 3, the description will be made of an example in which a packet requiring no functional processing is forwarded. When the packet is inputted into IFE2 (2-1 in this example), search processing is performed in the function search table 233 (FIG. 2) on the basis of address information in the header imparted to the packet. In this example, as the search result, only output port number P4 is obtained (which corresponds to a case of address a on the function search table shown in FIG. 6). The packet will be forwarded to IFE2-4 at the destination through SWE1 on the basis of information of the port number P4 imparted at a destination header generator 234.

In the above-described example, only forwarding processing of a packet is performed. When no functional processing is required for the packet communication device, FP-A to FP-D 3A to 3D will not be needed. In this case, it can be made into a packet communication device having simple structure at low cost.

When it becomes necessary to add functional processing in addition in the future, it is possible to add a desired functional processor without suspending an operation of the packet communication device.

Packet Forwarding Requiring One Functional Processing

Figure 4:
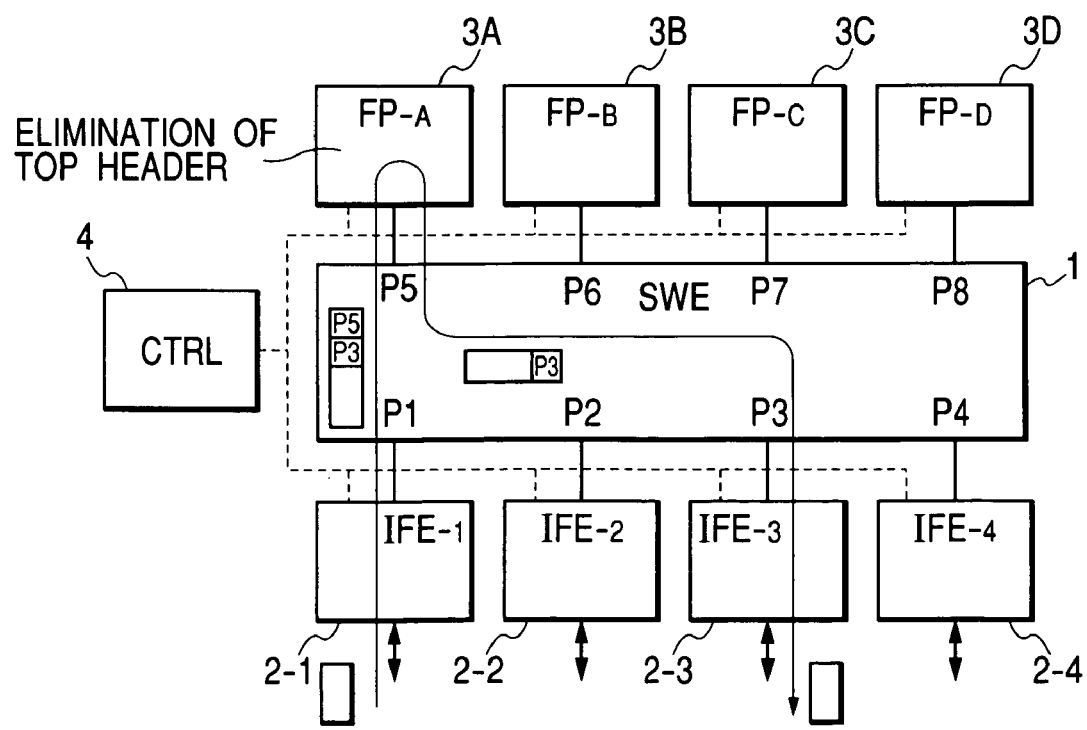
FIG. 4 is a block diagram showing another example in which a packet is forwarded within a packet communication device according to the present invention.

FIG. 4 shows an example in which a packet requiring one functional processing is forwarded. When the packet is inputted into IFE2 (2-1 in this example), search processing is performed at the function search table 233 (FIG. 2). Even in this example, the search processing is performed on the basis of address information in the header information imparted to the packet. As the search result, a function of FP-A 3A and a port number P3 of IFE2 are obtained (which corresponds to a case of address b on the function search table shown in FIG. 6). To the packet, a port number P5 corresponding to FP-A 3A and port address information corresponding to a port number P3 of egress IFE2 are stacked and imparted at the destination header generator 234 (FIG. 2). In this case, as regards port numbers corresponding to respective FP3A to 3D, it may be possible to arrange the structure such that port numbers corresponding to each functional processing are retained on the function search table 233, or such that the destination header generator 234 is provided with a list of correspondence between functional processing required and port numbers.

First a packet with stacked port numbers (forwarding information) will reach FP-A 3A through SWE1 in accordance with forwarding information corresponding to a port number P5, and be subjected to desired functional processing.

Next, forwarding information (in the case of this example, forwarding information corresponding to the port number P5) imparted at the head is deleted from the packet subjected to the functional processing at a header processor 31. This packet is switched in accordance with forwarding information (in the case of this example, forwarding information corresponding to the port number P3) which will appear at the head next time, and is forwarded to an egress IFE2-3.

Packet Forwarding Requiring Plural Functional Processing

FIG. 5 shows an example of forwarding of a packet when plural functional processing is required. When the packet is inputted into IFE2 (IFE-1 2-1 in this example), search processing is performed at the function search table 233 (FIG. 2) on the basis of address information in the header information of the packet. As the search result, a function at FP-A 3A, a function at FP-B 3B and port information P4 of an egress IFE2 (IFE-4 2-4 in the example of FIG. 5) are obtained (which correspond to a case of address c on the function search table shown in FIG. 6).

Forwarding information concerning a port number P5 of a port, to which FP-A 3A is connected, a port number P6 of a port, to which FP-B 3B is connected, and a port number P4 of a port, to which an egress IFE2 is connected, is stacked to the packet header in order at the destination header generator 23. In this case, concerning port numbers of ports to which respective FP-A to FP-D 3A to 3D are connected respectively, it may be possible to arrange the structure such that port numbers corresponding to each functional processing are retained on the function search table 233, or such that the destination header generator 234 is provided with a list of correspondence between functional processing and port information.

In FIG. 5, a packet with stacked forwarding information reaches FP-A 3A through SWE1 first in accordance with forwarding information of a port number P5 and is subjected to desired functional processing. After the functional processing, forwarding information (in the case of this example, information corresponding to the port number P5) imparted at the head of the packet is deleted at a header processor 31 (FIG. 7). Next, the packet reaches FP-B 3B in accordance with forwarding information (in the case of this example, information corresponding to the port number P6) which will appear at the head next time, and is subjected to the desired functional processing. After subjected to the functional processing, similarly as above, forwarding information (in the case of this example, information corresponding to the port number P6) imparted at the head of the packet is deleted at the header processor 31 (FIG. 7). Thus, in accordance with forwarding information (in the case of this example, information corresponding to the port number P4) which will appear at the head next time, the packet will be switched so that it is forwarded to the egress IFE2-4.

In this example, a case where the packet is subjected to two types of functional processing is shown, but when subjected to n types of functional processing, information corresponding to n-pieces of port numbers which correspond to respective FP can be stacked as forwarding information in advance. Also, when the packet has priority in plural functional processing, a port number of FP corresponding to functional processing with higher priority is stacked at the head of the forwarding information. Thereby, it becomes possible for each packet to be subjected to functional processings considering priorities of them. For example, only a packet which has passed through the filtering processing is subjected to the next functional processing. Therefore, it becomes possible to perform processing with efficiency.

Figure 8:
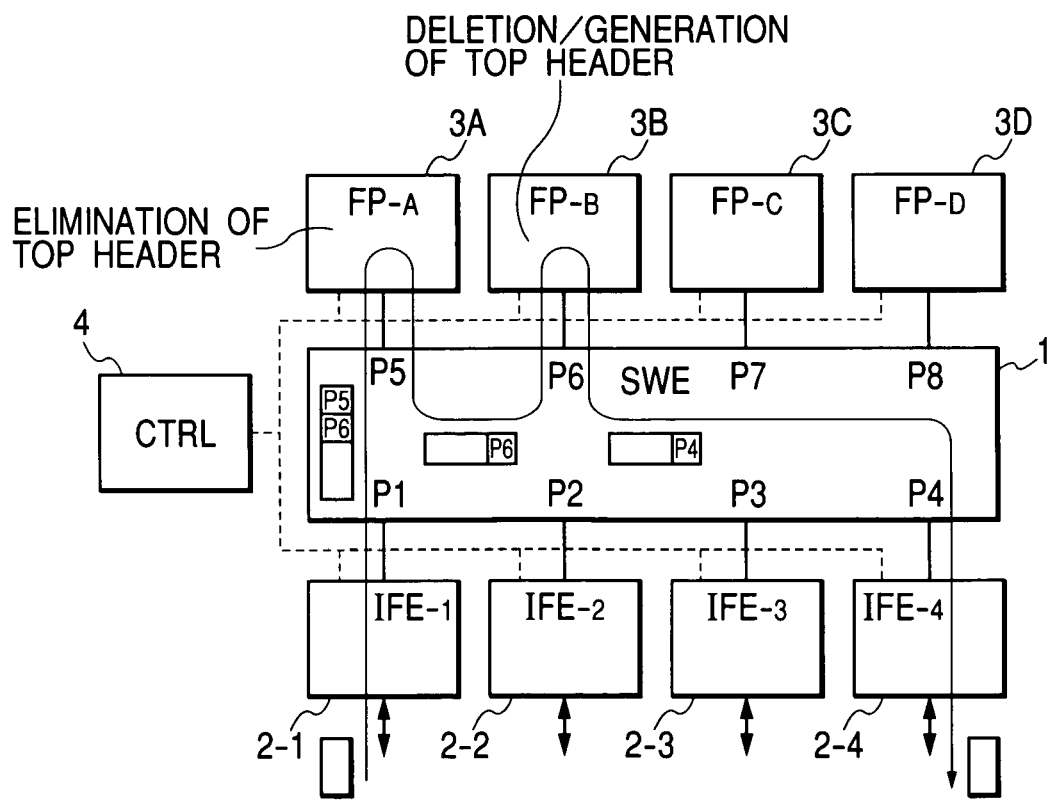
FIG. 8 is a block diagram showing an example in which a packet is forwarded within the packet communication device according to the present invention, and showing an example in which forwarding information is imparted to the packet within the function processor.

In the examples described above, the function search table 233 (FIG. 2) determines functions of FP-A to FP-D 3A to 3D and port numbers of egress IFE-1 to IFE-4 2-1, but it is also possible to arrange the structure such that a port number of egress IFE2 can be determined by any of FP-A to FP-D 3A to 3D as shown in FIG. 8.

FIG. 8 shows a flow of processing when search processing of the port number of egress IFE2 is performed by FP-B 3B. For example, an example of application in which when the base system is for IPV4, FP-B 3B is made into an IPV6 processing module, or an example of application in which when the base system is for the layer 2 switch, FP-B 3B is made into the layer 3 processing module. By adopting such structure, it is also possible to perform processing responsive to a different protocol or a different layer.

In FIG. 8, when a packet is inputted into IFE2 (IFE-1 2-1 in this example), search processing is performed by the function search table 233 (FIG. 2) on the basis of address information in the header information of the packet. As the search result, the function of FP-A 3A and the function of FP-B 3B are obtained. Information concerning a port number P5 of a port, to which FP-A 3A is connected, and a port number P6 of a port, to which FP-B 3B is connected, is stacked to the packet in order at the destination header generator 234 as forwarding information.

In this case, regarding the port number corresponding to each of the respective FP-A to FP-D 3A to 3D, it may be possible to arrange the structure such that port numbers corresponding to each functional processing are retained on the function search table 233, or such that the destination header generator 234 is provided with a list of correspondence between functional processing and port information.

The packet to which forwarding information stacked has been imparted reaches FP-A 3A through SWE1 first in accordance with forwarding information corresponding to the port number P5 and be subjected to desired functional processing. After subjected to the functional processing at FP-A 3A, forwarding information (in the case of this example, information corresponding to the port information P5) imparted at the head of the packet is deleted at the header processor 31 (FIG. 7). The packet is forwarded FP-B 3B in accordance with forwarding information (in the case of this example, information corresponding to the port number P6) which will appear at the head next time.

In FP-B 3B, as the result of search processing based on address information in the header information, the packet obtains port information (in the case of this example, corresponds to the port number P4 of a port to which IFE-4 2-4 is connected) of egress IFE2. After the forwarding information (in the case of this example, information corresponding to the port number P6) imparted at the head of the packet is deleted at the header processor 31 (FIG. 7), new forwarding information corresponding to the port number P4 of the port, to which the egress IFE2 is connected is attached to the packet header, and thereafter, the packet will be switched so that it is forwarded to an egress IFE-4 2-4 in accordance with this forwarding information.

Second Embodiment

In the first embodiment, the description has been made of a case where each of FP-A to FP-D 3A to 3D has a functional processing function different from one another. In a packet communication device according to the second embodiment, in a case where the device is insufficient in processing capacity when an attempt is made to execute a predetermined function with one FP3, the processing will be performed by additionally installing a plurality of FP3, each having the same function. In other words, a plurality of FP3 having the same function will be installed to perform load balancing among the plurality of FP3.

Figure 9:
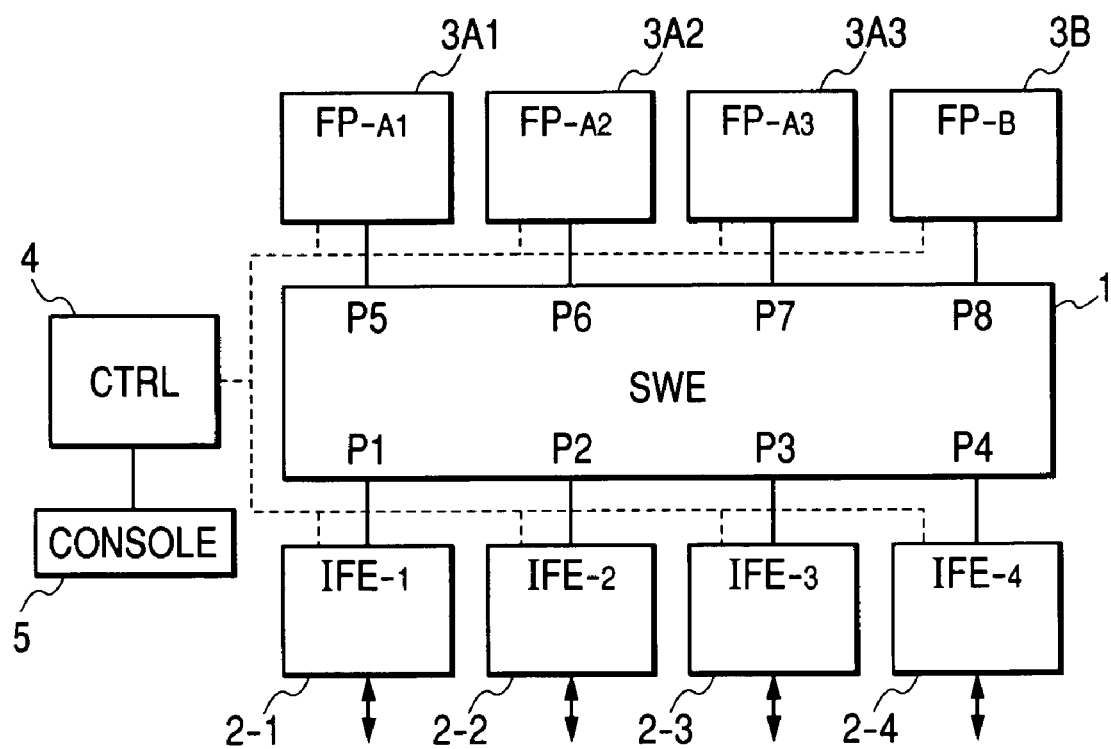
FIG. 9 is a block diagram showing a structural example of the packet communication device according to second or third embodiments of the present invention.

FIG. 9 shows when three FP (FP-A1 to FP-A3 3A1 to 3A3) of the same type are installed with the objective of increasing the processing capacity of the FP-A 3A as an example. Each of the FP-A1 to FP-A3 3A1 to 3A3 is connected to a port P5 to a port P7 of SWEL respectively. In this case, FP-B 3B for performing functional processing of a different type is connected to a port P8 of SWE1.

Figure 10:
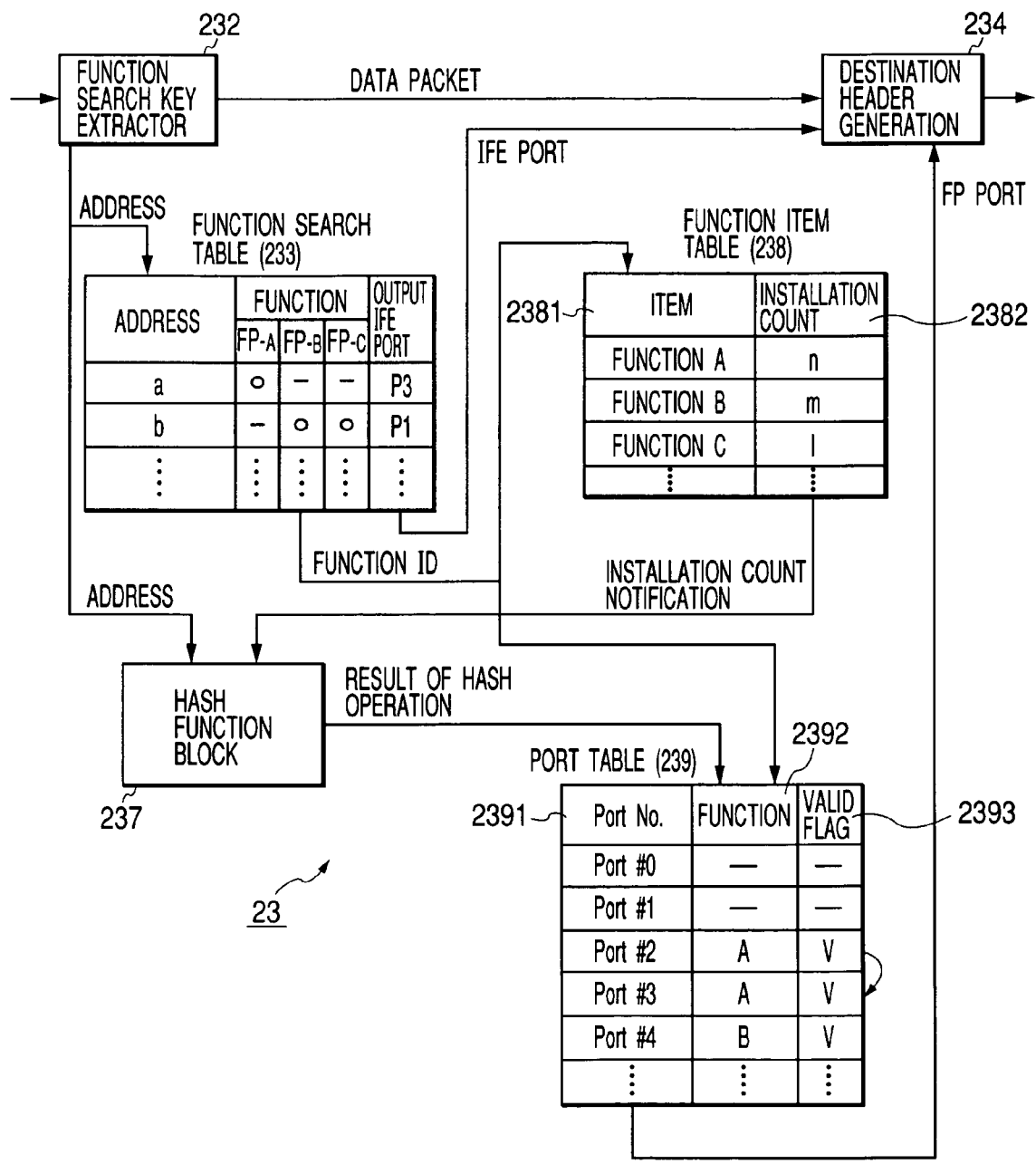
FIG. 10 is a block diagram showing a structural example of an ingress forwarding processor of the packet communication device according to the second embodiment of the present invention.

Since the structure of each of IFE-1 to IFE-4 2-1 to 2-4 is the same as the structure shown in FIG. 2, only the difference will be described below. It is different from the packet communication device according to the first embodiment in structure of the ingress forwarding processor 23. With reference to FIG. 10, the description will be made of the structure of this ingress forwarding processor 23.

The ingress forwarding processor 23 for performing load balancing of functional processing is composed of: a function search key extractor 232; a function search table 233; a destination header generator 234; a function item table 238; a port table 239; and a HASH function block 237.

When a packet is inputted into the ingress forwarding processor 23, the function search key extractor 232 reads out address information from a header imparted to the packet to transmit this information to the function search table 233 and the HASH function block 237. The packet itself is transmitted to the destination header generator 234. In the function search table 233, it will be searched with the address information as a key to find which function the packet to be inputted requests, and which is a port number, to which IFE2 at the output destination is connected.

One or plural function IDs (which represent function items the inputted packet requires) to be outputted from the function search table 233 will be transmitted to the function item table 238 and the port table 239. Also, the port number of IFE2 at the output destination will be transmitted to the destination header generator 234.

The function item table 238 controls a function item 2381 and an installation count 2382 of FP which corresponds to the function item, and outputs an installation count 2382 of FP corresponding to the requested function inputted to the HASH function block 237.

The HASH function block 237 calculates an integer value which is uniquely determined in accordance with the address from the address of the packet and FP installation count 2382 of a function which the packet requests. For example, when the FP installation count 2382 corresponding to a function item 2381 is N (where it is assumed that 1<N), in the HASH function block 237, a value of n (where $1 \leq n \leq N$) which is determined fixedly for the address will be calculated by a HASH operation.

As one example of a method of constituting the HASH function block 237, it can be constituted as described below. That is, the HASH function block 237 is preferably composed of (M−1) types of HASH functions corresponding to each of a variance number 2 to M (where M is a maximum load balancing number which is assumed as a system in advance) so that this can meet various FP installation count 2382. Thus, the HAS function is switched correspondingly to the FP installation count 2382 to be inputted into the HASH function block 237. The HASH function is constituted as described above, whereby it becomes unnecessary to recombine the HASH functions every time FP 3 is increased and decreased.

The result of HASH operation is transmitted to the port table 239. The port table 239 is composed of: port numbers (2391) and function items (2392) of ports, to which FP-A1 to FP-A3, FP-B 3A1 to 3A3 and 3B are connected respectively, and a VALID flag (2393) indicating whether or not each of FP 3A1 to 3A3 and 3B is valid, that is, whether it is ready to use or not.

First, a valid port number 2391 which has been entered in a n-th place is searched out of port numbers 2391 of FP3 which have been entered on the port table 239 and have the functions concerned, on the basis of an integer value n to be outputted from the HASH function block 237. Next, the selected port number is transmitted to the destination header generator 234. In this case, the valid port number is a port number at which the VALID flag 2393 has been set validly. For example, in FIG. 10, when function item=A and integer value=1 are designated on the port table 239, a port #2 will be transmitted to the destination header generator 234, and when function item=A and integer value=2 are designated, a port #3 will be transmitted to the destination header generator 234.

The destination header generator 234 stacks forwarding information corresponding to an egress IFE port number received from the function search table 233 and all port numbers received from the port table 239 to impart to the packet.

As described above, a packet communication device according to the second embodiment performs load balancing among a plurality of FPs having the same function on the basis of the address of the packet, whereby it is possible to provide functional processing capability as needed.

Also, since packets having the same address can be subjected to the processing always by means of the function of the HASH function block 237 at the same FP3, when being subjected to functional processing, it is possible to keep integrity of the sequence of flow of the packet, and therefore, it becomes also possible to assemble the packet and be subjected to processing at the application layer.

In order to increase the processing capability of a specific function, the FP3 concerned will be added and installed on an empty port of SWE1. At this time, a processor installation count of the function concerned of the function item table 238 is updated, a function item of FP3 newly added and a port number is added to the port table 239. In this case, it is not necessary to change a function search table 233 having an enormous amount of entries of address, but since the processing is completed only by updating the function item table 238 and the port table 239, it becomes possible to extend or delete functions without suspending the service.

Renewal of information of the function item table 238 and the port table 239 associated with changes (extension, deletion, the above-described changes in setting of validity and invalidity, and the like) of functions is performed by a management console 5 to be connected to CTRL4 (FIG. 9) through CTRL4.

Third Embodiment

The description will be made of an example in which IFE2 for constituting a packet communication device for performing load balancing of functional processing among a plurality of FP3 has different structure from a packet communication device according to the second embodiment.

Since a packet communication device according to the third embodiment is similar to the packet communication device according to the second embodiment shown in FIG. 9 in general structure, the description will be made with a particular emphasis on differences with the packet communication device according to the second embodiment with reference to FIG. 9 appropriately.

Figure 11:
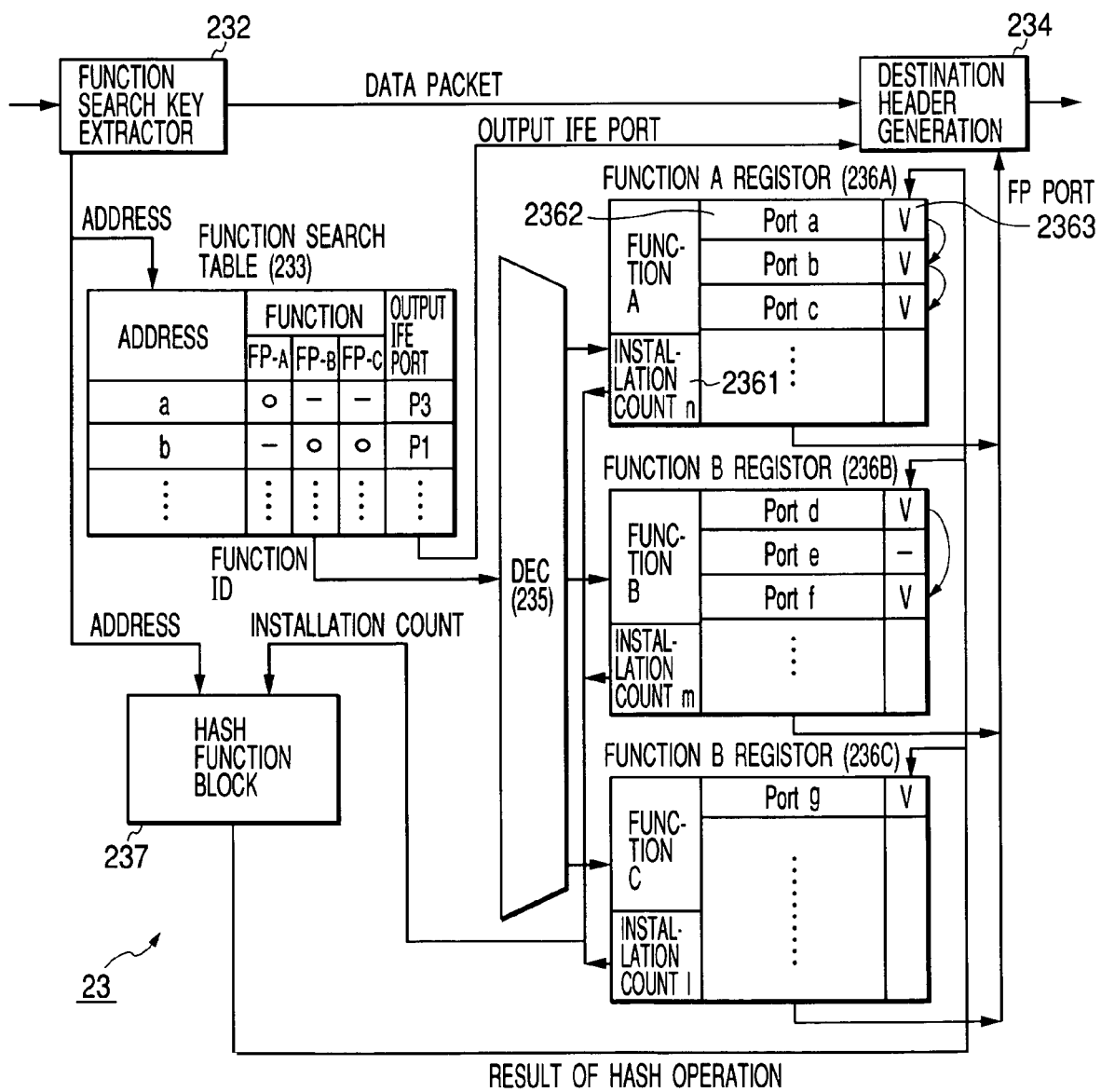
FIG. 11 is a block diagram showing a structural example of an ingress forwarding processor of the packet communication device according to the third embodiment of the present invention.
Figure 12:
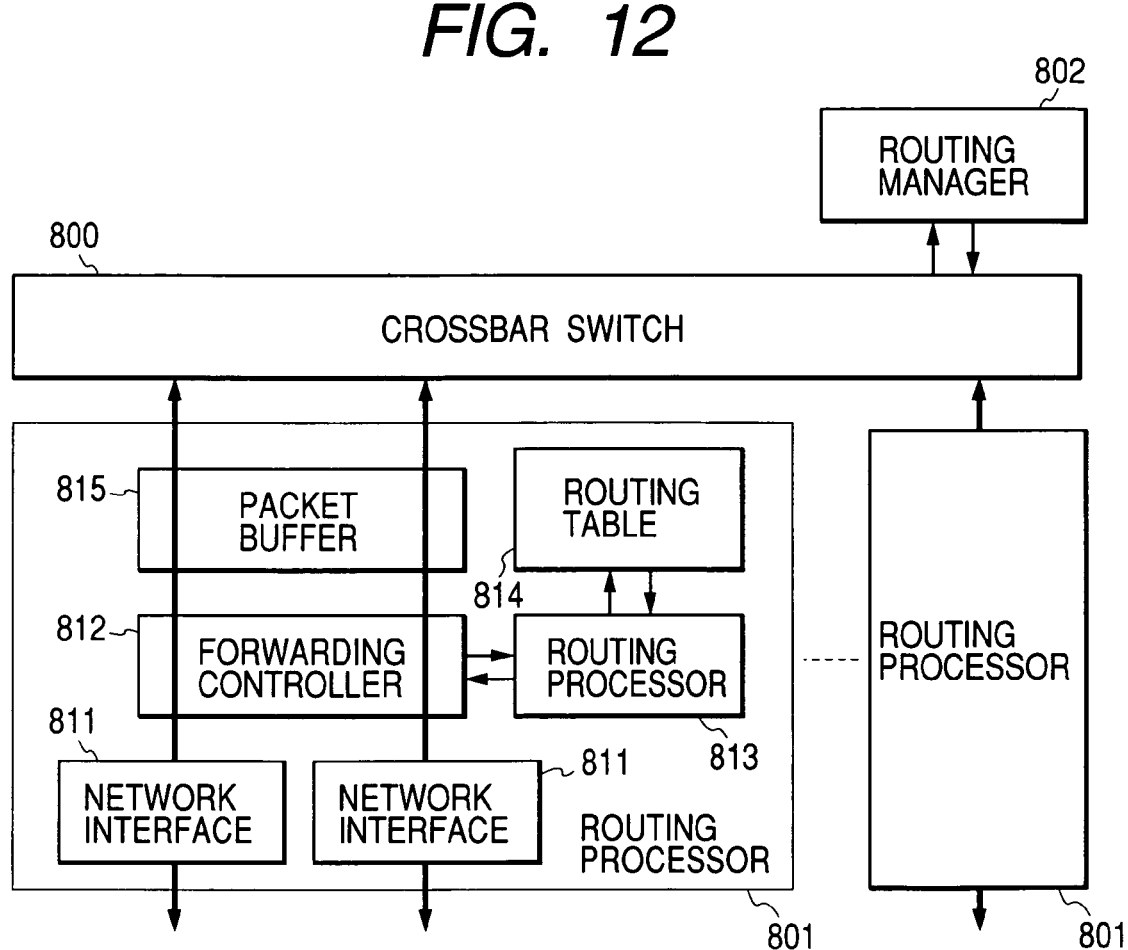
FIG. 12 is a block diagram showing structure of a conventional packet communication device.

Since the internal structure of each of IFE-1 to IFE-4 2-1 to 2-4 of the packet communication device according to the third embodiment is also the same as the structure shown in FIG. 2 except a portion to be described below as in the case of the packet communication device according to the second embodiment, the description thereof will be omitted. It is different from the packet communication devices according to the first and second embodiments in structure of the ingress forwarding processor 23. With reference to FIG. 11, the description will be made of the structure of this ingress forwarding processor 23. In this respect, in the following, component elements identical to those shown in FIG. 10 are designated by the identical reference numerals, and description thereof will be omitted.

The ingress forwarding processor 23 corresponding to load balancing of functional processing is composed of: a function search key extractor 232; a function search table 233; a destination header generator 234; a function decoder 235; a function register 236; and a HASH function block 237.

The function register 236 is composed of a function register A 236A, a function register B 236B, a function register C 236C, . . . which are to be disposed in accordance with the type of function.

When a packet is inputted into the ingress forwarding processor 23, the function search key extractor 232 reads out address information from a header imparted to the packet to transmit this information to the function search table 233 and the HASH function block 237. The packet itself is transmitted to the destination header generator 234.

In the function search table 233, it will be searched with the address information as a key to find a function the packet requests, and a port number, to which IFE2 at the output destination is connected. One or plural functions ID (information concerning function item) to be outputted from the function search table 233 will be transmitted to the function decoder 235. Information concerning the port number of IFE2 at the output destination also will be transmitted to the destination header generator 234. The function decoder 235 decodes function ID to be inputted to select any of a plurality of function registers 236 (236A to 236C).

The respective function registers 236A, 236B, . . . are composed of: an installation count 2361 of usable FP3 corresponding to the function; a port number 2362 indicating to which port of SWE1 (FIG. 8) FP3 is connected; and a VALID flag 2363 indicating whether or not FP3 which is installed on the port is usable.

The HASH function block 237 receives FP installation counts 2361 from the respective function registers, and calculates an integer value which is uniquely determined on the basis of the address inputted from the function search key extractor 232 and the FP installation counts 2361 to return the result to the function register 236.

For example, when the FP installation count 2361 corresponding to a certain function is n (where it is assumed that 1<n), the HASH function block calculates any of values from 1 to n which is determined fixedly to the address in the header information to be imparted to the packet by a HASH function to return to the function register 236. The respective function registers 236 transmit, to the destination header generator 234, a valid port number which has been stored at an address position corresponding to an integer value obtained from the HASH function block 237. In this case, the valid port number is a port number at which the VALID flag (2361) has been set "validly".

For example, in FIG. 11, when integer value=1 is returned to a function register 236A corresponding to the function A, a port number corresponding to port a will be transmitted to the destination header generator 234, and when integer value=2 is returned, a port number corresponding to port b will be transmitted to the destination header generator 234. The destination header generator 234 stacks forwarding information corresponding to a port number, to which an egress IEF is connected, received from the function search table 233 and all port numbers received from the function register 236 to impart to the packet.

As described above, the load balancing is performed among a plurality of FPs having the same function on the basis of the address of the packet, whereby it is possible to provide functional processing capability as needed.

Also, since packets having the same address can be forwarded to the same FP3 for processing, when being subjected to functional processing, it is possible to prevent the order of flow of the packet from being reversed, and therefore, it becomes also possible to assemble the packet and be subjected to processing at the application layer.

When increasing the processing capability of a specific function, if the FP3 concerned is added and installed on an empty port of SWE1, a new port number 2362 is added to the function register 236 concerned, and the installation count 2361 and the VALID flag 2363 are updated, it will be possible to easily add the load balancing number from n-parallel to n+1 parallel, n+2 parallel, . . . . In this case, it is not necessary to change the function search table 233 having an enormous amount of entries of address, but since the processing is completed only by changing the function register 236, it becomes possible to extend or delete functions without suspending the service.

The processing procedure of expansion/removal becomes simpler in the sense that in the packet communication device according to the second embodiment shown in FIG. 10, it is necessary to change the function item table 238 and the port table 239, whereas in the packet communication device according to the third embodiment, a change only in the function register 236 will suffice. The function register 236 is normally changed by a management console 5 (FIG. 9) to be connected to CTRL4.

In this respect, the structure of the HASH function block 237 in the packet communication device according to the third embodiment is capable of easily coping with an increase and decrease of the FP3 because it has the similar structure to one described in the second embodiment.

As described above, according to the packet communication devices of the first to third embodiments, addition and removal of a function can be easily performed. Specifically, it is possible to provide such a packet communication device that a packet communication device based on the provision of only a simple forwarding function of the layer 2 or the layer 3 is made into a base model and when a functional service such as application layer processing or security is required, these can be added to the base model as a functional packet processing module or a functional switch module as needed.

Further, correspondence relationship between a flow of packet and the function concerned, and relationship between various functions, their installation counts and physical installation positions are separated and controlled, whereby it is possible to provide a packet communication device capable of easily adding and removing a functional packet processing module without suspending the service.

In the first to third embodiments described above, the description has been made of an example in which a packet is forwarded on the basis of forwarding information and a port number which has become unnecessary after termination of the processing is deleted successively from the forwarding information. In contrast to this, while the packet is being forwarded within the packet communication device, it may be possible to continue to retain all the forwarding information in a stacked state and to determine the next forwarding destination according to pointer information indicating where the next forwarding destination is. In this case, the forwarding information and the pointer information can be erased at a point of time whereat all the processing has been completed. For example, at a step before the packet is transmitted to the outside of the device after it is forwarded to the egress IFE2, the above-described forwarding information and pointer information can be erased.

Also, in the foregoing, the description has been made of an example in which the forwarding information is handled as so-called header information in which the forwarding information is added to the head of the packet, but the present invention is not limited thereto.

In addition, it goes without saying that a number of ports to be provided on the packet communication device and a number of FP3 and IFE4 can be increased and decreased as needed.

In the above-described embodiments, "packets having the same address" may be packets having the same source address, or may be packets having the same destination address. Or, it may be packets having the same source destination address. Further, it may be packets to be outputted to the same line interface.

The present invention includes the following example as an embodiment.

[1] A packet communication device, comprising:
- a plurality of line interfaces capable of, of reception and transmission of a packet, at least either;
- a plurality of functional processors for performing functional processing of incoming packets received by the plurality of line interfaces;
- a plurality of ports to which the plurality of line interfaces and the plurality of functional processors are connected;
- a function entry unit in which correspondingly to packet address information imparted to the incoming packet, a function item of functional processing which the incoming packet requires, and an output port address of a port to which the line interface for transmitting the incoming packet after processing to the outside is connected are to be registered;
- a connection number entry unit in which a connection number for each function item is registered correspondingly to function items of the plurality of functional processors;
- a port entry unit in which function items of the functional processors to be connected are entered correspondingly to respective port addresses of the plurality of ports;
- a function processor for deriving data which uniquely corresponds to a combination of the connection number to be obtained from the connection number entry unit and the packet address information correspondingly to function types to be obtained from the function entry unit on the basis of the packet address information; and
- a forwarding information generator which reads out function items corresponding to the packet address information from the function entry unit, reads out port addresses corresponding to a combination of the function items and the data to be derived at the function processor from the port entry unit; reads out output port addresses corresponding to a combination of the port address and the packet address information from the function entry unit, generates forwarding information within the device on the basis of the port address and the output port address to impart to the incoming packet.

[2] A packet communication device, comprising:

The packet communication device according to [1] or [2], wherein a plurality of functional processors to be used for performing functional processing of incoming packets received by any of the plurality of line interfaces;
- a plurality of ports, to which the plurality of line interfaces and the plurality of functional processors are connected;
- a function entry unit in which correspondingly to packet address information imparted to the incoming packet, a function item of functional processing which the incoming packet requires, and an output port address of a port to which a line interface for transmitting the incoming packet after the processing to the outside is connected are to be entered;
- a connection information entry unit in which a number of connections of the plurality of functional processors and port address to be connected are classified for each function item described above for registration;
- a function processor for deriving data which uniquely corresponds to a combination of the connection number to be obtained from the connection information entry unit and the packet address information correspondingly to function types to be obtained from the function entry unit on the basis of the packet address information; and
- a forwarding information generator which reads out function items corresponding to the packet address information from the function entry unit, reads out port addresses corresponding to a combination of the function items and the data to be derived at the function processor from the connection information entry unit; reads out output port addresses corresponding to a combination of the port address and the packet address information from the function entry unit, and generates forwarding information within the device on the basis of the port address and the output port address to impart to the incoming packet.

[3] The packet communication device according to [1] or [2], wherein when of the plurality of functional processors, a connection number of the same function, which is a connection number of functional processors having the same function, is changed, the function processor derives data that uniquely corresponds to a combination of the connection number after the change to be obtained from the connection information entry unit and the packet address information correspondingly to function type to be obtained on the basis of the packet address information from the function entry unit.

[4] The packet communication device according to [3], wherein the function processor has a plurality of HASH function arithmetic units, and when the connection number of the same function is changed, of the plurality of HASH functions, there is selected a HASH function corresponding to the connection number of the same function after the change.

[5] A communication method to be applied to a packet communication device having:
- a plurality of line interfaces capable of, of reception and transmission of a packet, at least either; and
- a plurality of ports to which the plurality of line interfaces are connected, and to which at least one functional processor to be used in order to perform functional processing of an incoming packet received by any of the plurality of line interfaces can be installed as needed, comprising the steps of:
- judging function item to be requested by the incoming packet;
- determining a forwarding port of the incoming packet in response to the function item judged, and imparting, to the incoming packet, forwarding information that is information for designating the forwarding port; and
- switching the forwarding path when forwarding among the plurality of ports on the basis of the forwarding information.

[6] A communication method to be applied to a packet communication device having:
- a plurality of line interfaces capable of, of reception and transmission of a packet, at least either;
- one or a plurality of functional processors to be used in order to perform functional processing of an incoming packet received by any of the plurality of line interfaces; and
- a plurality of ports to which the plurality of line interfaces and one or a plurality of functional processors described above are connected, comprising the steps of:
- judging function item to be requested by the incoming packet;
- determining a forwarding port of the incoming packet in response to the function item judged, and imparting, to the incoming packet, forwarding information that is information for designating the forwarding port; and performing functional processing on the incoming packet, determining, as a forwarding port, a port to which a line interface for transmitting the incoming packet to the outside, of the plurality of line interfaces, on the basis of the result of the functional processing, is connected, and imparting, to the incoming packet, forwarding information corresponding to the forwarding port.

[7] A communication method to be applied to a packet communication device having:
- a plurality of line interfaces capable of at least either of reception and transmission of a packet;
- a plurality of functional processors capable of performing the same functional processing on an incoming packet received by any of the plurality of line interfaces; and
- a plurality of ports to which the plurality of line interfaces and the plurality of functional processors are connected, comprising the steps of:
- judging function item to be requested by the incoming packet;
- determining a forwarding port of the incoming packet in response to the function item judged, and if when imparting, to the incoming packet, forwarding information that is information for designating the forwarding port, the same address information is imparted to the incoming packet to be received successively by any of the plurality of line interfaces, fixedly designating a port to which the same functional processor is connected, of the plurality of functional processors, as the forwarding port; and
- switching the forwarding path on the basis of the forwarding information when forwarding the incoming packet among the plurality of ports.

[8] A communication method to be applied to a packet communication device having:
- a plurality of line interfaces capable of, of reception and transmission of a packet, at least either;
- a plurality of functional processors for performing functional processing on an incoming packet received by any of the plurality of line interfaces; and
- a plurality of ports to which the plurality of line interfaces and the plurality of functional processors are connected, comprising the steps of:
- entering a function item of the functional processing which the incoming packet requires and an output port address of a port to which a line interface for transmitting the incoming packet after the processing to the outside is connected in a function entry table correspondingly to packet address information imparted to the incoming packet;
- entering a connection number for each function item in a connection number entry table correspondingly to function items of the plurality of functional processors;
- entering function items of a functional processor to be connected in a port entry table correspondingly to respective port addresses of the plurality of ports;
- searching the function items from the function entry table on the basis of the packet address information, and searching a connection number corresponding to the function item from the connection number entry table;
- performing the function processing for deriving data that uniquely corresponds to a combination of the connection number to be obtained in the search step and the packet address information; and
- generating forwarding information within the device from a port address which is obtained by searching the port entry table on the basis of the function item to be obtained by searching the function entry table on the basis of the packet address information and the data to be derived by the function processing step, and an output port address which is obtained by searching the function entry table on the basis of the packet address information, and imparting forwarding information to the incoming packet.

[9] A communication method to be applied to a packet communication device having:
- a plurality of line interfaces capable of, of reception and transmission of a packet, at least either;
- a plurality of functional processors to be used in order to perform functional processing on an incoming packet received by the plurality of line interfaces; and
- a plurality of ports to which the plurality of line interfaces and the plurality of functional processors are connected, comprising the steps of:
- entering, correspondingly to the packet address information imparted to the incoming packet, function items of functional processing which the incoming packet requires, and output port address of a port, to which a line interface for transmitting the incoming packet after the processing to the outside is connected, in a function entry table;
- classifying a connection number of the plurality of functional processors and a port address to be connected every the function item to enter in a connection information entry table;
- searching the function entry table on the basis of the packet address information, searching the connection information entry table on the basis of function item to be obtained, and performing function processing for deriving data that uniquely corresponds to a combination of the connection number to be obtained and the packet address information; and
- generating forwarding information within the device from the port address which is obtained by searching the connection information entry table on the basis of the function item to be obtained by searching the function entry table on the basis of the packet address information and the data to be derived from the function processing step, and an output port address which is obtained by searching the function entry table on the basis of the packet address information, and imparting to the incoming packet.

What is claimed is:

1. A packet communication device, comprising:
- a plurality of line interfaces capable of reception or transmission of a packet;
- a plurality of ports to which said plurality of line interfaces are connected and to which at least one functional processor to be used to perform functional processing on an incoming packet received by any of said plurality of line interfaces can be connected as needed;
- a function item judgment unit for judging a function item to be required for said incoming packet;
- a forwarding information generator for determining a forwarding port for said incoming packet in accordance with said function item obtained from judging by said function item judgment unit and imparting to said incoming packet forwarding information for designating said forwarding port;
- a forwarding path switching unit for switching a forwarding path when forwarding said incoming packet among said plurality of ports based on said forwarding information, wherein when said function item judgment unit has judged that a plurality of functional processings are required for said incoming packet, the plurality of forwarding information corresponding to functional processors capable of executing said required functional processings is imparted to said incoming packets at the forwarding information generator in order to forward said incoming packets successively to a plurality of ports to which the functional processors capable of executing said required functional processings are connected respectively, wherein in order to forward those incoming packets which have been subjected to said plurality of functional processing to any of said plurality of line interfaces, said forwarding information generator further imparts, to said packet, forwarding information corresponding to a port, to which the said line interface is connected for forwarding said incoming packets; and a forwarding information eliminator for eliminating, after said incoming packet is forwarded to a predetermined port based on said forwarding information, forwarding information corresponding to said port from forwarding information added to said incoming packet.

2. The packet communication device according to claim 1, wherein said forwarding information and said subsequent forwarding information will be erased before said incoming packet is outputted to the outside from any of said plurality of line interfaces.

3. A packet communication device, comprising:
a plurality of line interfaces capable of reception or transmission of a packet;
one or a plurality of functional processors to be used to perform functional processing on an incoming packet received by any of said plurality of line interfaces;
a plurality of ports to which said plurality of line interfaces and said one or a plurality functional processors are connected;
a function item judgment unit for judging a function item to be required for said incoming packet;
a forwarding information generator for determining a forwarding port for said incoming packet in accordance with said function item obtained by judging by said function item judgment unit, and imparting to said incoming packet forwarding information for designating said forwarding port; and
a functional processor with a forwarding information generation function for performing functional processing on said incoming packet, determining, as a forwarding port, a port to which any of said plurality of line interfaces is connected based on a result of said functional processing, and imparting to said incoming packet forwarding information corresponding to said forwarding port,
when said function item judgment unit has judged that a plurality of functional processings are required for said incoming packet the plurality of forwarding information corresponding to functional processors capable of executing said required functional processings is imparted to said incoming packet at the forwarding information generator in order to forward said incoming packet successively to a plurality of ports to which the functional processors capable of executing said required functional processings are connected respectively,
wherein said function item judgment unit and said forwarding information generator are incorporated in at least in one of said plural line interfaces, and
wherein when a forwarding port cannot be determined, said incoming packet is forwarded to a port to which a functional processor with said forwarding information generation function is connected.

4. The packet communication device according to claim 3, wherein when said incoming packet conforms to a first predetermined communication protocol, all forwarding ports, including a port to which a line interface for transmitting said incoming packet to the outside is connected, are determined by the line interface which has received said incoming packet, and wherein when said incoming packet conforms to a second predetermined communication protocol, in said functional processor with said forwarding information generation function a port to which a line interface for transmitting said incoming packet to the outside is connected is determined as a forwarding port.

5. A packet communication device, comprising:
a plurality of line interfaces capable of reception or transmission of a packet;
a plurality of functional processors capable of performing the same functional processing on an incoming packet received by any of said plurality of line interfaces;
a plurality of ports to which said plurality of line interfaces and said plurality of functional processors are connected;
a function item judgment unit for judging a function item to be required for said incoming packet; and
a forwarding information generator for determining a forwarding port of said incoming packet in response to said function item judged by said function item judgment unit, and imparting to said incoming packet forwarding information for designating said forwarding port,
wherein when the same address information is imparted to said incoming packet to be received successively by any of said plurality of line interfaces, a port to which the same functional processor is connected of said plurality of functional processors, is fixedly designated as said forwarding port;
a forwarding path switching unit for switching a forwarding path when forwarding among said plurality of ports based on said forwarding information,
when said function item judgment unit has judged that a plurality of functional processings are required for said incoming packet the plurality of forwarding information corresponding to functional processors capable of executing said required functional processings is imparted to said incoming packet at the forwarding information generator in order to forward said incoming packet successively to a plurality of ports to which the functional processors capable of executing said required functional processings are connected respectively.

6. The packet communication device according to claim 5, further comprising:
one or plural functional processors each capable of a functional processing different from functional processings of the other functional processors,
wherein when it has been judged by said function item judgment unit that plural types of functional processings are necessary for said incoming packet, said forwarding information generator imparts, to said incoming packet, a plurality of forwarding information corresponding to a plurality of ports, to which plural types of functional processors corresponding to functional processing of said plural types are connected respectively.

7. The packet communication device according to claim 6, wherein said function item judgment unit comprises:
a function search unit for searching, based on address information imparted to said incoming packet, types of functional processing required by said incoming packet and a port to which a line interface for transmitting said incoming packet after the processing to the outside is connected;

a function item search unit for searching function items of functional processors connected to said plural ports and a connection number for each function item; and a port search unit for searching function items of functional processors to be connected correspondingly to each of said plural ports.

* * * * *